United States Patent [19]

Hulyalkar et al.

[11] 4,269,743
[45] May 26, 1981

[54] LOW TOXICITY VINYL HALIDE STABILIZER COMPOSITIONS

[75] Inventors: Ramchandra K. Hulyalkar, Oakland; Gerald A. Baum, Paramus, both of N.J.

[73] Assignee: Dart Industries Inc., Los Angeles, Calif.

[21] Appl. No.: 45,551

[22] Filed: Jun. 4, 1979

[51] Int. Cl.³ .......................... C08K 5/05; C08K 5/09
[52] U.S. Cl. .......................... 260/23 XA; 252/400 R; 252/407; 260/45.7 PH; 260/45.75 W; 260/45.95 L
[58] Field of Search .................. 260/23 XA, 45.95 L; 252/400 R, 407

[56] References Cited

U.S. PATENT DOCUMENTS

| | | | |
|---|---|---|---|
| 2,861,052 | 11/1958 | Elliott | 260/45.95 L |
| 2,918,451 | 12/1959 | Elliott | 260/45.95 L |
| 3,309,338 | 3/1967 | Scullin | 260/23 XA |
| 3,396,132 | 8/1968 | Perry et al. | 260/45.95 L |
| 3,429,844 | 2/1969 | Neros et al. | 260/45.95 L |
| 3,453,225 | 7/1969 | Pollock | 260/23 XA |
| 3,649,577 | 3/1972 | Dworkin et al. | 260/23 XA |
| 3,953,358 | 4/1976 | Sjogreen | 260/45.95 L |
| 4,057,672 | 11/1977 | Creekmore et al. | 260/23 XA |
| 4,159,973 | 7/1979 | Hock et al. | 260/23 XA |
| 4,169,819 | 10/1979 | Shiohara et al. | 260/23 XA |

FOREIGN PATENT DOCUMENTS 1859  5/1979  European Pat. Off. .......... 260/45.95 L

*Primary Examiner*—Ronald W. Griffin
*Attorney, Agent, or Firm*—Bryant W. Brennan; Harold R. Beck

[57] ABSTRACT

A vinyl halide resin stabilizer composition which essentially contains:

(a) a calcium, zinc or mixed calcium/zinc salt of a higher fatty acid; and (b) a polyhydroxy alcohol component wherein at least 50% of this component is either di-or tri-pentaerythritol.

These compositions synergistically contribute to the heat stability of vinyl halide resin compositions and offer significant heat stabilization economies. Early color as well as long term heat stability performances of the metal salt compounds are improved in the compositions disclosed thereby permitting the reduction in amounts of such compounds needed for stabilization.

21 Claims, No Drawings

LOW TOXICITY VINYL HALIDE STABILIZER COMPOSITIONS

BACKGROUND OF THE INVENTION

Degradation by the action of heat and light is a major problem in the use of vinyl halide resins. Various additives have been proposed as stabilizers to offset the deleterious effects of heat and light in the manufacture of useful articles from such resins. The problem has been compounded in recent times by the numerous governmental regulations designed to safeguard the environment and to reduce or eliminate potential hazards to the well being of the populace.

The emphasis on environmental quality and the increasing awareness of toxicological requirements have led the plastics industry, and in particular the vinyl halide resin field, to seek a satisfactory replacement for the high performance stabilizers based upon the compounds of the heavy metals, such as cadmium, barium, lead, etc., currently in wide usage in the industry.

The use of calcium and zinc salts of higher fatty acids for the stabilization of vinyl halides is well recognized in the art. However, these salts, and similar salts of magnesium and tin, do not provide the same degree of effectiveness as the salts of barium and cadmium. It is, therefore, clearly a desirable objective to increase the effectiveness of the stabilizers based upon calcium and zinc, and thereby provide an effective replacement for the lead, barium and cadmium based stabilizers.

SUMMARY OF THE INVENTION

The present invention is directed to further improvements in vinyl halide resin stabilizer systems based upon calcium and zinc compounds. This invention in one of its aspects provides for synergistic heat stabilizer compositions of such calcium and zinc compounds as stabilizers and certain polyhydric alcohols. It has been found that early color heat performances of zinc and calcium compounds are significantly improved according to the principles of this invention by their combination with particular polyhydric alcohols. Furthermore, improvements in long term heat stability are achievable along with early color heat improvements. In another of its significant features, stabilizer compositions are provided which are shelf-stable at ambient temperatures. Such stable compositions are easily formulated into vinyl halide resin systems and offer synergistically heat stabilized resin systems with enhanced resistance to both early discoloration and long term heat degradation of molded plastics. These and other advantages will become apparent in the following detailed description.

This invention is predicated in part upon the unexpected heat stabilization of vinyl halide resins by zinc and calcium salts in combination with certain polyhydric alcohols. In particular, a polyol selected from the group consisting of dipentaerythritol and tripentaerythritol and mixtures thereof, both with each other and with other previously known polyols, such as pentaerythritol, mannitol and sorbitol, and a zinc and/or calcium containing compound together contribute highly unexpected heat stabilization to a vinyl halide resin. It has been found that synergistic heat stabilizations are provided by such compositions, i.e., the sum of the stabilizing effects of an amount of each component alone upon the resin is exceeded when the same amounts of components are together in the vinyl halide resin formula. Such unexpected results and other advantages are empirically demonstrated in the operating examples of this invention, and a further understanding thereof will become apparent in view of the detailed description herein. The synergistic effectiveness is especially exhibited by an enhanced resistance of the resin formula to early discoloration during heating to elevated temperatures of about 200° F. to about 400° F. Also, long term heat stability improvement can be achieved in addition to resistance to early discoloration. "Early color" development is a term well understood in the art and means the time within which the resin formula starts to yellow under the action of heat, either under static oven or dynamic working conditions. Whereas, "long term" heat stability refers to the time within which such resin formula under the action of heat severely darkens or degrades to a dark color such as dark red or black.

Broad ranges of components of the stabilized compositions and components of the stabilizer compositions can be employed in this invention. Particularly useful stabilized compositions of this invention are achieved with a total parts by weight range on the order of about 0.05 to about 5 parts by weight based upon 100 parts by weight (phr) of the vinyl halide resin. A most useful range of total parts by weight of stabilizer composition is on the order of about 0.5 to about 3 phr and this depends upon the desired heat stability in a particular vinyl halide resin composition consistent with other requirements and economies.

There are certain generally preferred weight ratios of the calcium and zinc containing compounds relative to a particular polyhydric alcohol. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular polyhydric alcohol and a particular calcium and zinc containing compound will vary as exemplified herein. But, most preferably and in general, the combination of polyhydric alcohol with the calcium and/or zinc containing compound is utilized at total parts on the order of about 0.3 to about 5 phr; and where the polyhydric alcohol is from about 10 to about 100 percent by weight of the calcium and/or zinc compound.

DESCRIPTION OF THE PREFERRED EMBODIMENT

The novel stabilizer composition of the present invention as previously disclosed in this application is comprised of two components; the first, a calcium, a zinc or a mixed calcium-zinc salt of a higher fatty acid; and the second, a polyhydric alcohol from the group consisting of dipentaerythritol, tripentaerythritol, mixtures of these two polyhydric alcohols, and mixtures of these two polyhydric alcohols, either separately or in combination, with certain other polyhydric alcohols, particularly with pentaerythritol, mannitol or sorbitol.

Dipentaerythritol or tripentaerythritol can be used individually or in any proportions in a mutual combination. In combinations with the other recited polyhydric alcohols, the di-and/or-tripentaerythritol componet will be present in an amount of from about 20% to about 100%. Preferably, at least about 50% of any such combination will consist of the di-and/or-tripentaerythritol component.

The salt component can be a calcium or zinc salt of a carboxylic acid, advantageously of a $C_8$–$C_{24}$ carbon chain length monocarboxylic acid such as lauric, oleic or stearic acid. It can also be a mixed calcium/zinc salt of such acids, such salts and their preparation being familiar to those skilled in the art to which the present invention pertains. In the preferred embodiment of the present invention, it is preferred to employ a mixture of zinc stearate and calcium stearate as the metal salt component.

The stabilizer compositions of the present invention can include various additional compounds as set forth hereafter:

(a) Lubricants for providing the chlorine-containing polymer composition with lubricity:
 higher aliphatic alcohols
 full or partial esters of polyhydric compounds
 higher aliphatic amides
 comparatively macromolecular organic polymers such as AC polyethylene (oxidized polyethylene wax sold by Allied Chemicals under the trade name AC Polyethylene)

These lubricants may be added up to about 15 parts by weight per 100 parts by weight of the chlorine-containing polymer.

(b) Plasticizers:
 phthalic esters such as di-2-ethyl hexyl phthalate (DOP)
 fatty acid esters such as stearic esters
 straight chain dibasic acid esters such as dioctyl adipate
 epoxy compounds such as epoxidized soybean oil
 phosphate compounds such as tricresyl phosphate
 chlorinated olefin, chlorinated paraffin, or chlorinated rubber These plasticizers may be employed by combining one or more of them with the chlorine-containing polymer at the rate of from about 2 to about 100 parts by weight of the former per 100 parts by weight of the latter.

(c) Other additives:
 epoxy compounds: may be added at the rate of 0.1–20 parts by weight per 100 parts by weight of the chlorine-containing polymer.
 auxiliary stabilizers such as esters of organic phosphite compounds: may be added at the rate of 0.1–5 parts by weight per 100 parts by weight of the chlorine-containing polymer.
 antioxidant such as hindered phenols, sulphur-containing organic compounds: may be added at the rate of 0.01–2 parts by weight of the chlorine-containing polymer.
 Light Stabilizer: may be added at the rate of 0.01–2 parts by weight of the chlorine containing polymer. Further, flame retardants, chemical blowing agents, antistatic agents, pigments, dyes, extenders or fillers may also be employed in combination with the stabilizer of the present invention.

The vinyl halide resin employed is most commonly a a homopolymer of vinyl chloride, i.e., polyvinyl chloride. It is to be understood, however, that this invention is not limited to a particular vinyl halide resin such as polyvinyl chloride. Other halogen-containing resins which are employed and which illustrate the principles of this invention include chlorinated polyethylene, chlorinated polyvinyl chloride, and the vinyl halide resin types. Vinyl halide resin, as understood herein, and as appreciated in the art, is a common term and is adopted to define those resins or polymers usually derived by polymerization or copolymeriziation of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymer, vinyl chloride-vinylidene copolymers, vinyl chloride-propylene copolymers, chlorinated polyethylene; and the like. Of course, the vinyl halide commonly used in the industry is the chloride, although others such as bromide and fluoride may be used. Examples of the latter polymers include polyvinyl bromide, polyvinyl fluoride, and copolymers thereof.

The stabilizing composition of the present invention can be incorporated by standard incorporation techniques. Thus, it can be added to the solid resin and mixed therein by means of hot rolls or other mixing machines adapted to mix solid resins. It can also be dissolved in a suitable solvent and then mixed with the resin, or the solution of the stabilizer can be mixed with a solution of the resin. The most important consideration is that the stabilizer and resin be thoroughly admixed and the dispersion of the stabilizer in the resin be as complete and as rapid as possible.

In general, chlorine containing vinyl resins, such as polyvinyl chloride, copolymers of vinyl chloride, etc. have very poor resistance to the effects of heat and/or light. It is well known to those skilled in the art that severe exposure, of the chlorine containing vinyl resins, to heat and/or light brings about discoloration, brittleness and loss of strength. This degradation is especially pronounced during the various fabrication processes such as injection molding, calendering, etc.; operations which require heating of plastic compositions.

It is also recognized in the art to which the present invention pertains that processing stability, as measured by dynamic mill or Brabender torque, is a highly desirable characteristic in a vinyl halide resin - stabilizer system.

It is apparent, therefore, that the provision of a satisfactory stabilizer composition requires consideration of the many diverse requirements which must be met.

The effectiveness of the stabilizer compositions of the present invention in meeting such criteria is demonstrated in the following examples, which are provided by way of illustration only and are not to be construed as limiting the scope thereof.

In the examples which follow, certain materials are commonly or frequently employed and are identified by trade designations. Geon 103 EP is a polyvinyl chloride available from B. F. Goodrich and is characterized as a white powder which passes through a 42 mesh screen, with a specific gravity of 1.40 and has a molecular weight of 200,000. Admex 710 is an epoxidized soybean oil marketed by Ashland Chemical Co. Sancticizer 711 is a phthalate plasticizer marketed by Monsanto Co. and BHT is butylated hydroxytolune.

EXAMPLES 1-7

In Examples 1-7, the highly effective performance of dipentaerythritol, alone and in combination with pentaerythritol together with a mixture of calcium stearate and zinc stearate is demonstrated. All of the formulations employed in Examples 1-7 contained the standard vinyl halide resin composition set forth below together with the additives set forth in Table I.

The standard vinyl halide resin composition is prepared by thoroughly admixing the following ingredients in the recited amounts in a clean glass vessel:

| Geon 103 EP | 100 parts |
|---|---|
| Santicizer 711 | 35 parts |
| Admex 710 | 5 parts |
| Stearic Acid | 0.25 parts |

In each of the separate examples 1-7, the standard composition described above is thoroughly admixed with the remaining ingredients set forth under each example in Table I and the resulting mixture milled on an electrically heated two-roll mill at a temperature of 340° F. for a period of five (5) minutes after the mixture was banded on the mill.

In carrying out the tests whose results are reported in Table I, aging was carried out using a circulating air oven at 375° F.±1° F. 1"×1" samples were cut from the milled sheet and placed on a metal sheet covered with aluminum foil, kept in the oven and removed at 10 minute intervals. The early color stability (EC) was indicated in minutes at which the first color change (slight yellow) was observed. The long term stability (LTHS) was indicated in minutes at which samples became dark brown or black.

TABLE I

| Example | 1 | 2 | 3 | 4 | 5 | 6 | 7 |
|---|---|---|---|---|---|---|---|
| Calcium Stearate | 0.33 | 0.33 | 0.33 | 0.33 | 0.33 | 0.33 | 0.33 |
| Zinc Stearate | 0.66 | 0.66 | 0.66 | 0.66 | 0.66 | 0.66 | 0.66 |
| Pentaerythritol | 0.6 | 0.6 | 0.6 | 0.3 | 0.2 | — | — |
| Dipentaerythritol | — | — | — | 0.3 | 0.4 | 0.6 | 0.8 |
| BHT | 0.6 | 0.6 | 0.6 | 0.6 | 0.6 | 0.6 | 0.6 |
| Glycerol monostearate | 0.81 | 0.81 | 0.81 | 0.81 | 0.81 | 0.81 | 0.81 |
| Early Color Stability (min.) | 30 | 30 | 30 | 30 | 30 | 30 | 30 |
| Long term heat stability (min.) | 75 | 75 | 75 | 90 | 105 | 120 | 120+ |

EXAMPLES 8-11

In order to demonstrate the effectiveness of dipentaerythritol in providing satisfactory dynamic mill stability, Examples 8-11 were carried out with the results reported in Table 11.

A standard composition is provided by mixing the following ingredients in the recited amounts in a clean glass vessel for each of Examples 8-11. The standard composition is then further admixed with the additives set forth in Table II in the amounts recited therein. The mixture is compounded on an electrically heated two-roll mill at a temperature of 360° F.

The dynamic mill stability (DMS) is determined in the following manner. Every 5 minutes a sample (1"×1") was cut out directly from the mill, using the same area of the mill each time. The time in minutes, at which the sample discolored badly or stuck to the mill severely, was indicated as its DMS.

| Standard Composition | |
|---|---|
| Geon 103-EP | 100 |
| Santicizer-711 | 35 |
| Admex-710 | 5 |
| Stearic Acid | 0.25 |
| Calcium Stearate | 0.33 |
| Zinc Stearate | 0.66 |
| BHT | 0.6 |
| Glycerol Monostearate | 0.81 |

TABLE II

| Example | 8 | 9 | 10 | 11 |
|---|---|---|---|---|
| Pentaerythritol (Phr) | 0.6 | 0.6 | — | — |
| Dipentaerythritol (Phr) | — | — | 0.6 | 0.6 |
| Dynamic Mill Stability at 360° F. (min.) | 53 | 46 | 100 | 104 |

EXAMPLES 12-15

Replacing dipentaerythritol with tripentaerythritol gave results demonstrating similar improvement in early color stability and in long term heat stability. The same method of preparation is employed as in Examples 1-7 using the standard composition set forth below and the additives specified in Table III wherein the results of the tests carried out are reported.

| Standard Composition | |
|---|---|
| Geon 103EP | 100 |
| Santicizer 711 | 35 |
| Admex 710 | 5 |
| Stearic Acid | 0.25 |
| Calcium Stearate | 0.33 |
| Zinc Stearate | 0.66 |
| BHT | 0.6 |
| Glycerol Monostearate | 0.81 |

TABLE III

| Example | 12 | 13 | 14 | 15 |
|---|---|---|---|---|
| Tripentaerythritol | 0.6 | — | 0.6 | 0.6 |
| Pentaerythritol | — | 0.6 | — | — |
| Decyl diphenyl phosphite | — | — | 0.4 | — |
| Distearyl pentaerythritol diphosphite | — | — | — | 0.4 |
| E.C. (min.) | 30 | 30 | 60 | 75 |
| LTHS (min.) | 120 | 75 | 120 | 120 |

We claim:

1. A resin heat stabilizer composition which consists essentially of a metal salt of a higher fatty acid and a polyhydric alcohol selected from the group consisting of tripentaerythritol, mixtures of dipentaerythritol and tripentaerythritol, and mixtures of dipentaerythritol and tripentaerythritol, individually and in combination, with any of pentaerythritol, mannitol, sorbitol and mixtures thereof.

2. A composition according to claim 1 wherein the metal salt is calcium, zinc or a mixed calcium/zinc salt of a higher fatty acid.

3. A composition according to claim 2 wherein the proportion of the metal salt component to the polyhydric alcohol component is from about 1 to 9 to about 9:1.

4. A composition according to claim 3 wherein the metal salt is zinc stearate.

5. A composition according to claim 3 wherein the metal salt is calcium stearate.

6. A composition according to claim 3 wherein the metal salt is a mixed calcium-zinc stearate.

7. A composition according to claim 3 wherein the metal salt is a mixture of calcium stearate and zinc stearate.

8. A composition according to claim 3 wherein the polyhydric alcohol is tripentaerythritol.

9. A composition according to claim 3 wherein the polyhydric alcohol is a 1 to 1 mixture of dipentaerythritol to pentaerythritol.

10. A vinyl halide resin composition which comprises a vinyl halide resin and, as stabilizer an effective amount of a composition consisting essentially of a metal salt of a higher fatty acid and a polyhydric alcohol selected from the group consisting of tripentaerythritol, mixtures of dipentaerythritol and tripentaerythritol, and mixtures of dipentaerythritol and tripentaerythritol, individually and in combination, with any of pentaerythritol, mannitol, sorbitol and mixtures thereof.

11. A composition according to claim 10, wherein the vinyl halide resin is a vinyl chloride resin.

12. A composition according to claim 11 wherein the proportion of the metal salt component to the polyhydric alcohol component is from about 1 to 1 to about 10 to 1.

13. A composition according to claim 10 wherein the metal salt is calcium, zinc, a mixed calcium/zinc salt of a higher fatty acid or a mixture of calcium and zinc salts of a higher fatty acid.

14. A composition according to claim 13 wherein the metal salt is zinc stearate.

15. A composition according to claim 13 wherein the metal salt is calcium stearate.

16. A composition according to claim 13 wherein the metal salt is a mixed calcium-zinc stearate.

17. A composition according to claim 13 wherein the metal salt is a mixture of calcium stearate and zinc stearate.

18. A composition according to claim 13 wherein the polyhydric alcohol is tripentaerythritol.

19. A composition according to claim 13 wherein the polyhydric alcohol is a 1 to 1 mixture by weight of dipentaerythritol to pentaerythritol.

20. A composition according to claim 10, wherein the proportion of resin in stabilizer is from about 100 to 0.5 to about 100 to 5.

21. A vinyl halide resin composition which comprises 100 parts of a vinyl chloride resin and 0.5 to 5 parts of a stabilizer consisting essentially of a mixture of zinc stearate and calcium stearate and tripentaerythritol.

* * * * *